US009544617B2

(12) United States Patent
Oertel

(10) Patent No.: US 9,544,617 B2
(45) Date of Patent: *Jan. 10, 2017

(54) METHOD FOR DEBLOCKING FILTERING

(71) Applicant: Unify GmbH & Co. KG, Munich (DE)

(72) Inventor: Norbert Oertel, Landshut (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/000,343

(22) Filed: Jan. 19, 2016

(65) Prior Publication Data
US 2016/0142738 A1  May 19, 2016

Related U.S. Application Data

(63) Continuation of application No. 13/640,547, filed as application No. PCT/EP2010/002277 on Apr. 14, 2010, now Pat. No. 9,277,246.

(51) Int. Cl.
| | |
|---|---|
| *H04N 19/86* | (2014.01) |
| *H04N 19/80* | (2014.01) |
| *H04N 19/176* | (2014.01) |
| *H04N 19/61* | (2014.01) |
| *H04N 19/117* | (2014.01) |
| *H04N 19/17* | (2014.01) |
| *H04N 19/436* | (2014.01) |
| *H04N 19/70* | (2014.01) |

(52) U.S. Cl.
CPC .......... *H04N 19/86* (2014.11); *H04N 19/0089* (2013.01); *H04N 19/117* (2014.11); *H04N 19/17* (2014.11); *H04N 19/176* (2014.11); *H04N 19/436* (2014.11); *H04N 19/61* (2014.11); *H04N 19/70* (2014.11); *H04N 19/80* (2014.11)

(58) Field of Classification Search
CPC .. H04N 19/0089; H04N 19/117; H04N 19/17; H04N 19/176; H04N 19/436; H04N 19/61; H04N 19/80; H04N 19/86
USPC ...................................... 375/240.29
See application file for complete search history.

(56) References Cited

U.S. PATENT DOCUMENTS

| | | | |
|---|---|---|---|
| 9,277,246 B2* | 3/2016 | Oertel ................ | H04N 19/0089 375/240.29 |
| 2008/0123750 A1 | 5/2008 | Bronstein et al. | |
| 2008/0298472 A1 | 12/2008 | Jain et al. | |
| 2013/0251050 A1 | 9/2013 | Ikeda et al. | |
| 2014/0233649 A1 | 8/2014 | Cheng et al. | |

OTHER PUBLICATIONS

"Multiple Region-of-Interest Support in Scalable Video Coding" by Tae Meon Bae, Truong Cong Thang, Duck Yeon Kim, Yon Man Ro, Jung Won Kang and Jae Gon Kim; ETRI Journal, vol. 28, No. 2, Apr. 2008.

(Continued)

*Primary Examiner* — Behrooz Senfi
(74) *Attorney, Agent, or Firm* — Buchanan Ingersoll & Rooney PC

(57) ABSTRACT

A method for deblocking filtering a macroblock on the basis of a coding standard for image information which is stored in macroblocks. A context region comprising the blocks of a first macroblock to be filtered is formable from blocks which are arranged adjacent to one another horizontally in block rows and adjacent to one another vertically in block columns. The blocks of the context region can be filtered on the basis of the coding standard for image information.

18 Claims, 3 Drawing Sheets

(56) References Cited

OTHER PUBLICATIONS

International Search Report dated Dec. 15, 2010 of PCT/EP2010/002277 (German).
Written Opinion of the International Searching Authority dated Dec. 15, 2010 of PCT/EP2010/002277 (German).
International Preliminary Report on Patentability and Written Opinion for PCT/EP/2010/002277 dated Oct. 16, 2012 (German).
International Preliminary Report on Patentability and Written Opinion for PCT/EP/2010/002277 dated Oct. 16, 2012 (English).

* cited by examiner

METHOD FOR DEBLOCKING FILTERING

CROSS-REFERENCE TO RELATED APPLICATIONS

This application is a continuation application of U.S. patent application Ser. No. 13/640,547, which is the United States national phase under 35 U.S.C. §371 of PCT International Application No. PCT/EP2010/002277, filed on Apr. 14, 2010.

BACKGROUND OF THE INVENTION

Field of the Invention

Embodiments relate to methods for deblocking filtering a macroblock.

Background of the Related Art

In many applications, standardised methods are used to code image information. The video compression method according to the standard H.264 is used, for example, for:
- high-resolution television such as High Definition Television (HDTV) with video data storage on high-definition digital versatile disc (HD DVD) and Blu-ray disc,
- mobile terminals such as mobile telephones, personal digital assistants (PDAs), portable games consoles and MP3 players on which videos can be played back,
- multimedia,
- video-conference technology, and
- video cameras and digital cameras.

In video compression, video data is coded in a transmitter, transmitted to a receiver in coded form, and decoded in the receiver. The standards used are therefore also called codecs, a combination of the English words "code" and "decode".

In standard H.264 and its predecessor, standard H.263, individual video images, also called frames, are split into blocks and coded block by block, whereby in both standards, a deblocking filter is used in each case in the coding loop. Other video compression standards have deblocking filters with which the coded frames are filtered in a post-processing stage. The deblocking filter is used to increase the perceived image quality, whereby optically perceptible transitions between adjacent blocks, also called block artefacts, which can form between adjacent blocks, are smoothed by the filtering of the image points of each frame saved in the blocks. Below, "filtering" means "deblocking filtering". "Filtering a block" means "filtering the image points, also called pixels, saved in this block".

The blocks which are adjacent horizontally and vertically, and exist in a multiplicity of rows and columns, can be imagined as fields in a chessboard arrangement in a Cartesian coordinate system. The filtering of a block at position (x/y) of the Cartesian coordinate system is, according to standard H.264, dependent on filtered pixels of the blocks in the positions (x−1/y) and (x/y−1) of the Cartesian coordinate system. With the coding of image information according to standard H.264, the blocks are combined to form macroblocks, wherein each macroblock is made of blocks which are arranged adjacent to each other horizontally in block rows and adjacent to each other vertically in block columns, with four blocks in each case. "Filtering a macroblock" means "filtering the pixels of the blocks in the macroblock saved in this macroblock".

Filtering is carried out via a sequence of calculation steps also called an algorithm, wherein the calculation steps normally proceed in the context of a filter program on a computer. To carry out these calculation steps, a processor normally with a computation core, or simply core, is used. There is currently a trend towards processors with a number of cores, also called a "many-core processor" or a "many-core system". Even architectures of processors with a multiplicity of cores, also called "multi-core processors" or "multi-core systems", are being developed, as evidenced by the "Terascale" project or the "Larrabee" project from the company Intel. Graphics processors, called "graphic processor units" (GPUs), for example from the company NVidia, even today have many-core processors, which because of their high computing power and ease of programming are increasingly used for high-performance computing applications. To fully use the computing power available, processors with several or many cores need algorithms which are parallelisable. In parallelised algorithms, one calculation step does not depend on the results of previous calculation steps. If a calculation step depends on the results of previous calculation steps, these calculation steps must be carried out in series, i.e. consecutively, and cannot proceed in parallel with each other.

A problematic area in the implementation of standard H.264 in many-core processors is the deblocking filter in which there is no provision for a filtering of a macroblock independently of another macroblock due to the dependence of the filtering of a block at position (x/y) on the filtered pixels of the blocks at positions (x−1/y) and (x/y−1).

A known method for the partial parallelisation of the calculation steps of the filtering taking into account the data dependence described in the previous section consists of combining a number of blocks in the image of the Cartesian coordinate system into a diagonal. The diagonals formed from blocks are filtered consecutively in series, whereby the filtering of the blocks within a diagonal occurs in parallel to each other. However, in the procedure of the filtering of diagonals of blocks using a GPU from the company NVidia, drawbacks do arise:

1. The algorithm in which the implementation model of the filter programs is found, is also called a "kernel". There is a high cost in terms of time to initialise the GPU, also called the startup overhead, for the running of the filter programs for the parallel filtering of blocks within a diagonal, as the kernel algorithm, which becomes extensive to meet the requirements of the parallel filtering of blocks within a diagonal, has to be transferred onto the graphics card which contains the GPU and the computation cores of the GPU have to be configured according to the kernel algorithm before the calculation steps start.
2. "Kernel" algorithms carried out in parallel cannot be synchronised with each other or can only be synchronised with long delays, also called latency times.
3. The diagonals of blocks are often not long enough to fully utilise all the computation cores of the GPU, and in this case some of the GPU's computing power remains unused.

Another option for parallelising the calculation steps of the filtering consists of the filtering of macroblocks without taking account of the data dependence arising during filtering according to standard H.264, whereby this type of filtering is described by the inventor as a naive filter method. A filtered video frame is used to predict video frames which follow the filtered frame. If, the macroblocks needed to filter a macroblock and adjoining said macroblock are not filtered, discrepancies arise between this filtering result and the filtering result according to the standard. These discrepancies lead to pixel discrepancies between the filtering result of the naive filter method and the filtering result according to the standard, whereby these pixel discrepancies are also described as a drift effect, which clearly adversely affects the image quality of the decoded video frame compared to the image quality with filtering according to the standard.

BRIEF SUMMARY OF THE INVENTION

Embodiments provide a method for deblocking filtering. In particular, a method for deblocking filtering is provided in which the computing power of processors with several computation cores can be used and which leads to a high image quality. Methods are based on a coding standard for image information which is saved in macroblocks which are arranged adjacent to each other horizontally in macroblock rows and adjacent to each other vertically in macroblock columns, wherein each macroblock is formed from blocks which are arranged adjacent to each other horizontally in block rows m and adjacent to each other vertically in block columns n and form block elements $M_{mn}$ where m=1 to 4 and n=1 to 4 of a matrix M, wherein the blocks have vertical edges and horizontal edges and starting with block element $M_{11}$, the vertical edges and the horizontal edges of the blocks of a macroblock are filtered. The invention also relates to a deblocking filter with which a method such as this can be carried out, and a computer program with a filter algorithm to carry out a method such as this.

DETAILED DESCRIPTION OF EXEMPLARY EMBODIMENTS

Figure 1:
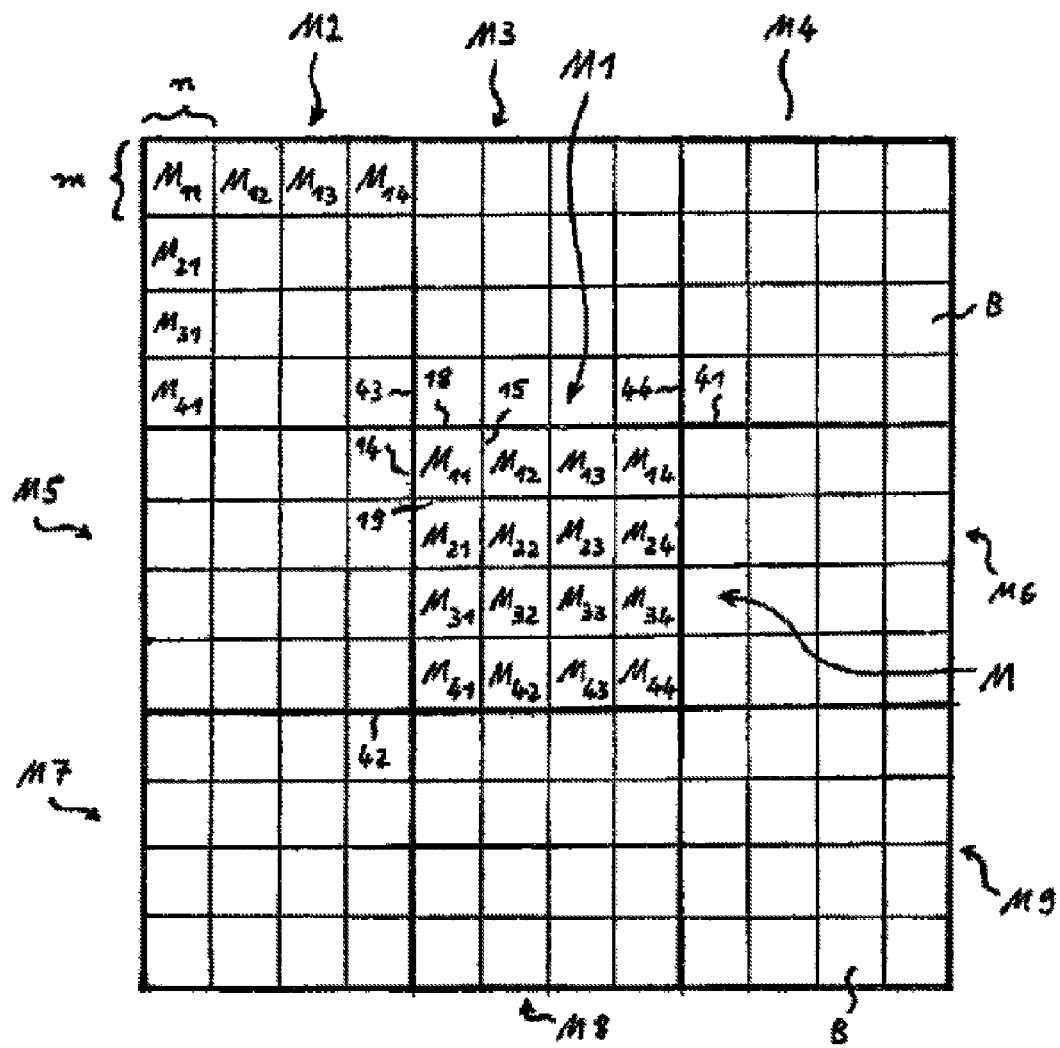
FIG. 1. An arrangement of adjacent macroblocks, wherein each macroblock is formed from blocks which are arranged adjacent to each other horizontally in block rows and adjacent to each other vertically in block columns of four blocks in each case.

According to one method for deblocking filtering, a macroblock according to a coding standard for image information which is saved in macroblocks, which are arranged adjacent to each other horizontally in macroblock rows and adjacent to each other vertically in macroblock columns, wherein each macroblock is formed from blocks which are arranged adjacent to each other horizontally in block rows m and adjacent to each other vertically in block columns n and form block elements $M_{mn}$ where m=1 to 4 and n=1 to 4 of a first matrix M, wherein the blocks have vertical edges and horizontal edges forming the outer boundaries of the blocks and starting with block element $M_{11}$, the vertical edges and the horizontal edges of the blocks of a macroblock are filtered, a context area containing the blocks of a first macroblock to be filtered is specified, which comprises blocks which are arranged adjacent to each other horizontally in block rows o and adjacent to each other vertically in block columns p and form block elements $K_{op}$, where o=1 to 7 and p=1 to 7 of a second matrix K, wherein the block elements $K_{rs}$ where r=3 to 6 and s=3 to 6 correspond to the block elements $M_{mn}$ where m=1 to 4 and n=1 to 4 of the first matrix M. The blocks from which the context area is formed are unfiltered in terms of deblocking filtering. The vertical edges and the horizontal edges of the blocks of the context area are then filtered, starting with block element $K_{11}$ of the second matrix K, in accordance with the coding standard for image information. The context area contains, alongside the macroblock to be filtered, only one of the borders around the macroblock to be filtered, comprising two single-row and two double-row block rows. Other than the total of 49 blocks of the context area, no other blocks are filtered to filter the macroblock of 16 blocks to be filtered. With the small number of blocks in the context area for the filtering of a macroblock, different macroblocks can be filtered independently of each other, resulting in a parallelisation of the calculation steps of the filtering of different macroblocks. The computing power of a processor with a number of computation cores can therefore be extensively or completely utilised. Within the context area, the blocks are filtered according to the data dependence specified by the standard. Due to the sufficiently high number of 33 blocks surrounding the macroblock to be filtered and the arrangement of the blocks surrounding the macroblock to be filtered, a filter result from the filtering of the context area with a high image quality of the macroblock to be filtered is guaranteed.

In a preferred embodiment of the invention, the coding standard for image information is standard H.264. Where this standard is used for filtering, measurements on test sequences produced a probability for a pixel discrepancy of +/−1 of less than $2\times10^{-6}$ in contrast to a value of around $3\times10^{-3}$ for the naive filter method. In contrast to the naive filter method, where standard H.264 is used, in terms of size, pixel discrepancies of more than 1 occur with a probability of less than $1\times10^{-9}$. The drift effect caused by these pixel discrepancies is negligibly small for many applications. Standards other than standard H.264 are likewise possible.

Each block is preferably formed from pixels to be filtered, which are arranged adjacent to each other horizontally in pixel rows and adjacent to each other vertically in pixel columns of four pixels in each case. A block comprising 4×4 pixels corresponds to standard H.264. A different number of pixels saved in one block is possible in theory.

In a further embodiment of the invention, pixels of the blocks of the context area which do not correspond to the pixels of the blocks of the first macroblock, are filtered chronologically before the pixels of the blocks of the first macroblock. In this way, the filtering can be commenced with a pre-filtering of the blocks of the context area which do not correspond to the blocks of the macroblock to be filtered.

Advantageously, the pixels of the blocks of the first macroblock are now filtered using the filtered pixels of the blocks of the context area which do not correspond to the pixels of the blocks of the first macroblock. The pixels of these pre-filtered blocks are available as input pixels for the filtering of the macroblock to be filtered. The pre-filtered pixels themselves are filtered according to the standardised method with partially unfiltered input pixels, as further pixels of the blocks outside the context area are not used for the filtering of the pre-filtered pixels. The use of these only nearly or approximately filtered pixels according to the standard leads to a drift effect which is lower by orders of magnitude for the pixels of the filtered macroblock than the drift effect achieved with unfiltered pixels outside the macroblock to be filtered according to the naive filter method.

Depending on a deblocking filter strength, fewer pixels than the pixels of the blocks in the context area, which do not correspond to the pixels of the blocks of the first macroblock, are used to filter the pixels of the blocks of the first macroblock. In this way, the computing effort is reduced without any adverse effect on image quality.

Particularly preferably, adjacent macroblocks which are filtered jointly form a macroblock area wherein the filtering of a macroblock or macroblock area occurs independently of another macroblock or another macroblock area. For example, four or more adjacent macroblocks can be filtered jointly. As the macroblocks are adjacent to each other, the context blocks which contain each of the macroblocks to be filtered, overlap. Because of the once-only filtering of the overlapping areas of the context blocks, the effort in terms of computing power falls in comparison with the case in which the context blocks are filtered completely in each case with the macroblocks to be filtered.

For example, the context area in an arrangement of four macroblocks to be filtered together, in two columns and two rows, contains in addition to the 64 blocks of the macroblocks to be filtered, a further 89 blocks to be filtered in the form of a border around the macroblocks. In the case of four macroblocks to be filtered independently of each other, the context area contains in addition to the 64 blocks of the macroblocks to be filtered, additionally 33 blocks each as the border around the particular macroblock, thus in total 132 blocks. Accordingly in the case of the joint filtering of the four macroblocks, the context area contains 43 blocks less than in the case of the independent filtering of four macroblocks. These 43 blocks less not only do not need to be filtered, but also do not need to be transferred from a main memory into a static random access memory (SRAM) for filtering. The number of macroblocks to be filtered jointly necessary for the optimum utilisation of the available computing power of the processor used depends on the number of available computation cores and the size of the SRAM memory available for the filtering.

In a further embodiment of the invention, the filtering of different macroblocks and/or macroblock areas occurs parallel to each other and simultaneously. In this way, the computing power potential of modern processors with several computation cores can be fully utilised. If the parallel filtering of several macroblocks or macroblock areas is carried out on a processor with various computation cores, the filtering can occur with high computing rates of up to one teraflop/second. Higher computing rates of 2, 3 or n teraflop/second, where n is a whole number, are likewise possible where suitable processors are used. The possible computing rate in teraflop/second is not a direct property of the filter algorithm, but of the processor used. However, a higher utilisation level of the processor used is achieved by the filtering method according to the invention in comparison to the naive filtering method, with the said higher utilisation level leading to a computing rate in teraflop/second.

According to the invention, a deblocking filter is also provided for filtering a macroblock based on a coding standard for image information which is saved in macroblocks, which are arranged adjacent to each other horizontally in macroblock rows and adjacent to each other vertically in macroblock columns, wherein each macroblock is formed from blocks which are arranged adjacent to each other horizontally in block rows m and adjacent to each other vertically in block columns n and form block elements $M_{mn}$ where m=1 to 4 and n=1 to 4 of a matrix M, wherein the blocks have vertical edges and horizontal edges forming the outer boundaries of the blocks and in each case with block element $M_{11}$ as the starting point for filtering, the vertical edges and the horizontal edges of the blocks of a macroblock can be filtered. The deblocking filter contains an analysis unit to determine a context area containing the blocks of a first macroblock to be filtered, said context area being formed of blocks which are arranged adjacent to each other horizontally in block rows o and adjacent to each other vertically in block columns p and form block elements $K_{op}$ where o=1 to 7 and p=1 to 7 of a second matrix K, wherein the block elements $K_{rs}$ where r=3 to 6 and s=3 to 6 correspond to the block elements $M_{mn}$ where m=1 to 4 and n=1 to 4 of the first matrix M. The deblocking filter also contains a filter unit for filtering the horizontal edges and the vertical edges of the blocks of the context area with the block element $K_{11}$ of the second matrix K as the starting point for filtering according to the coding standard for image information.

In an advantageous embodiment, the filter contains a processor with various computation cores. With several computation cores, filter steps according to the above embodiments can proceed in parallel to each other.

The filter advantageously contains a main memory and a static random access memory. The main memory and the static random access memory can be disposed on a graphics card which is disposed in a computer. Alternatively or additionally, another random access memory, another main memory or another electronic component can also be present. For example, a main memory and a random access memory can each be assigned to various computation cores.

In a further embodiment, in the filter, different macroblocks and/or different macroblock areas, which contain jointly filterable macroblocks, can be filtered in parallel to each other and simultaneously. In this way, the computing time needed to filter a macroblock can be reduced compared with filters which filter in series.

Furthermore, a computer program with a filter algorithm for carrying out the method according to the invention is provided. A filter algorithm is an algorithm for filtering. The filter algorithm is carried out by means of a computer program which contains the filter algorithm. Further embodiments and benefits of the invention are explained below by means of the figures. For greater clarity, the representation is not to scale or in proportion in the figures. Unless otherwise stated, the same reference symbols designate the same components with the same meaning in the figures.

The invention is now explained taking the example of standard H.264 on video compression. FIG. 1 shows in this regard an arrangement of nine macroblocks M1-M9, which are adjacent to each other horizontally in three macroblock rows and adjacent to each other vertically in three macroblock columns, as an excerpt from a coded frame. The macroblock M1, which is surrounded by the macroblocks M2, M3, M4, M5, M6, M7, M8 and M9 (below expressed in the abbreviated from M2-M9), is, like every macroblock, formed from blocks B which are arranged adjacent to each other horizontally in block rows m and adjacent to each other vertically in block columns n and form block elements $M_{mn}$ where m=1 to 4 and n=1 to 4 of a first matrix M. The block elements $M_{mn}$ are shown for the macroblock M1 and in part for the macroblock M2 in the range of the first block row m=1 and the first block column n=1 in FIG. 1. Different blocks are assigned to block elements with the same designation but in different macroblocks M1, M2.

The macroblocks M1-M9 have outer boundaries formed in each case by horizontal and vertical edges shown in bold. The macroblock M1 has for example a horizontal edge 41, which delimits the macroblock M1 from the macroblock M3. Furthermore, the macroblock M1 has a horizontal edge 42, which delimits the macroblock M1 from the macroblock M8. The macroblock M1 has a vertical edge 43, which delimits the macroblock M1 from the macroblock M5, and a vertical edge 44, which delimits the macroblock M1 from the macroblock M6.

Like the macroblocks M1-M9, the blocks B, which form the block elements $M_{mn}$, where m=1 to 4 and n=1 to 4 of the matrix M of a macroblock M1-M9, are also delimited from each other by edges. The block with block element $M_{11}$ is for example delimited from an adjoining block of the macroblock M2 by the horizontal edge 18, which forms part of the horizontal edge 41 of the macroblock M1. Furthermore, the block with the block element $M_{11}$ is delimited from the block with the block element $M_{21}$ by the horizontal edge 19. The block with the block element $M_{11}$ also has a vertical edge 14 as part of the vertical edge 43 to delimit it from an adjoining block in the macroblock M5 and a vertical edge 15 to delimit it from the block with block element $M_{12}$. The block edges of blocks B thus form a grid of lines, printed faintly, which are partially overlaid by the edges of macroblocks M1-M9 printed in bold, forming a superimposed grid.

Figure 2:
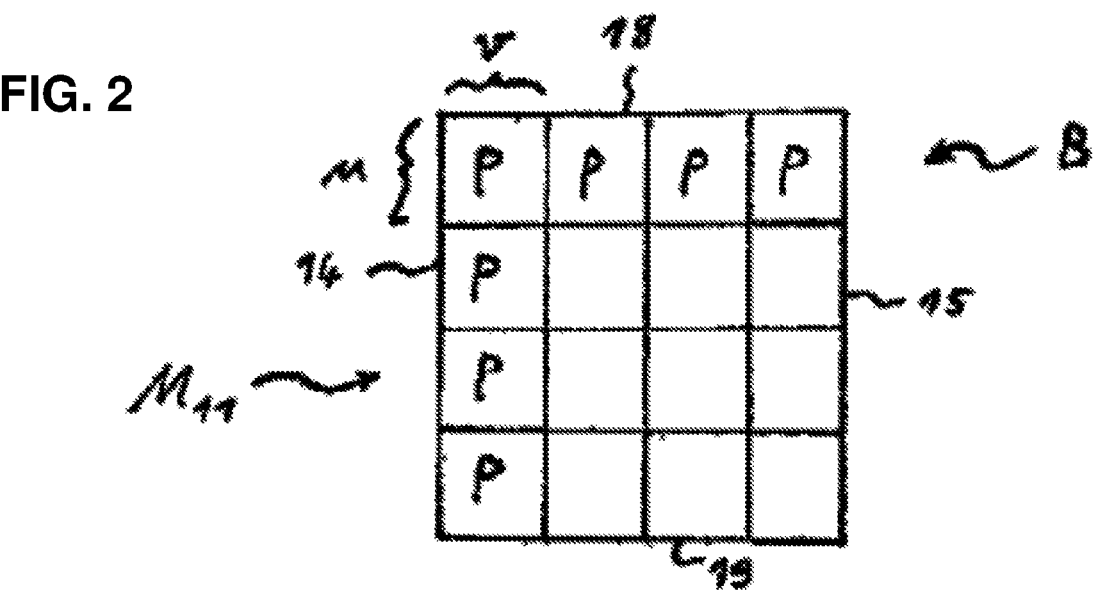
FIG. 2. A block formed from pixels which are arranged adjacent to each other horizontally in pixel rows and adjacent to each other vertically in pixel columns of four pixels in each case, and FIG. 3. A context area for filtering a macroblock which contains, in addition to the macroblock to be filtered, a border of blocks around the macroblock according to an example of an embodiment of the invention.

As shown in FIG. 2 taking the example of the block with the block element $M_{11}$, according to standard H.264, each block B is formed from pixels P, which are arranged adjacent to each other horizontally in pixel rows u and adjacent to each other vertically in pixel columns v with four pixels in each case. Each block contains 4×4 pixels wherein each macroblock of 4×4 blocks contains 16×16 pixels. The vertical edges 14, 15 and the horizontal edges 18, 19 delimit the pixels P from pixels of adjoining blocks, for example the blocks with the block elements $M_{12}$, $M_{21}$. The edges of each block and each macroblock thus delimit individual pixels P from each other, wherein one edge area contains all the pixels P which are arranged on one edge. Thus, in the edge area of edge 18 are all the pixels P of the pixel row u and the pixels P of the block B adjoining the pixels P of the pixel row u, which is next to the edge 18 of the block B with the block element $M_{11}$. Pixels P from the pixel rows which in a direction perpendicular to the edge 18 are further from the edge 18 than the pixel row u, can likewise be in the edge area of edge 18.

The edge area—i.e. the number of pixels P arranged on the edge—which is smoothed by the deblocking filter to increase the perceived image quality, should in theory be guided by the degree of optical perception of the transition between adjoining blocks B. The more clearly the optical transition between adjoining blocks B can be perceived, the more pixels should be included in the edge area which is to be filtered. The number of the pixels to be included in the edge area rises with increasing deblocking filter strength. It is possible for all pixels in a block to be used to smooth an edge area. However, the choice of the number of the pixels P arranged on the edge area, which are smoothed by the deblocking filter to increase the perceived image quality, is guided by the video-compression method used, for example standard H.264.

Figure 3:
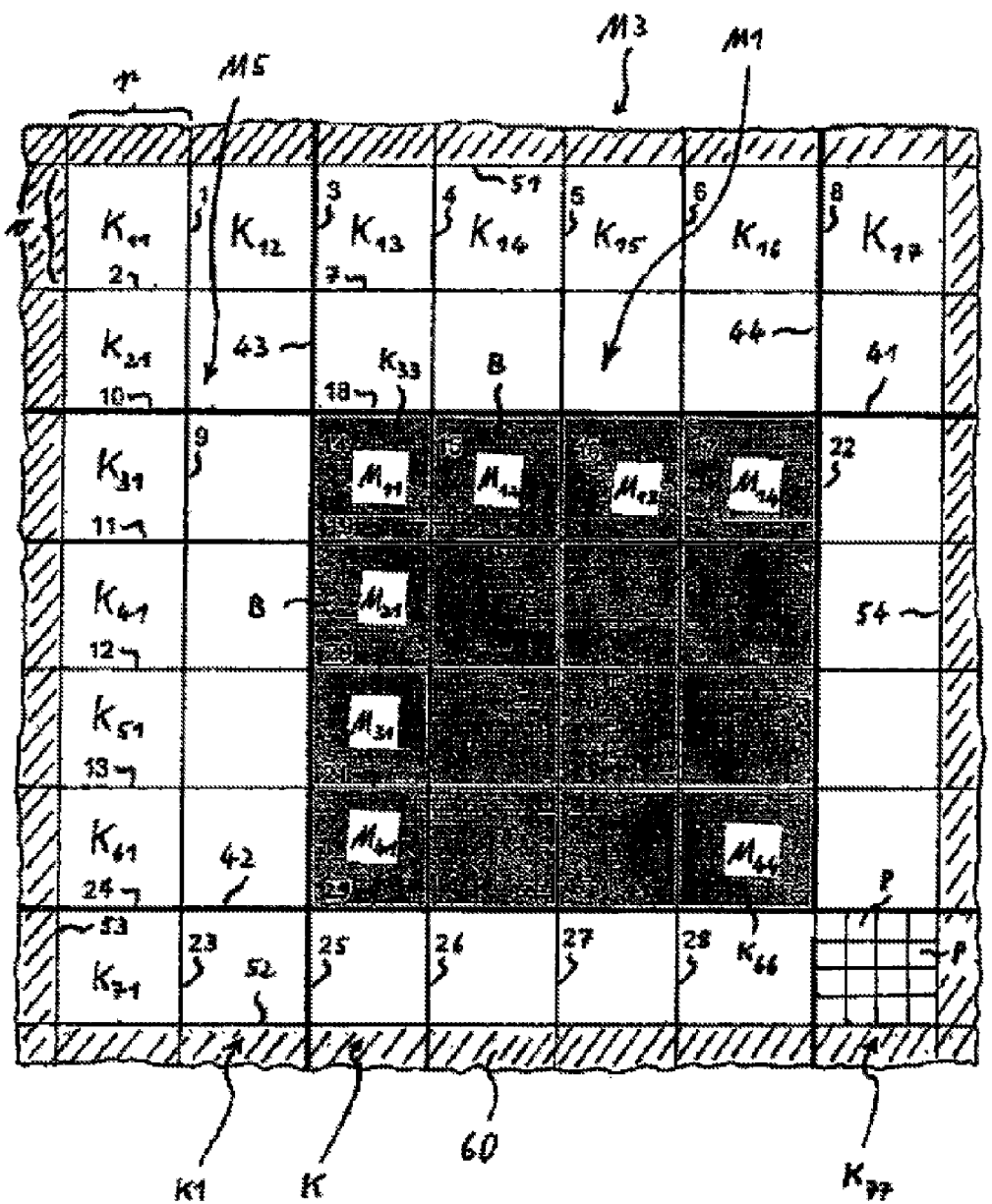

FIG. 3 shows a context area K1 for filtering the macroblock M1 which contains, in addition to the macroblock M1 to be filtered, a border around the macroblock, said border comprising 33 blocks. The context area K1 is formed from blocks B, which are arranged adjacent to each other horizontally in block rows o and adjacent to each other vertically in block columns p and form block elements $K_{op}$ where o=1 to 7 and p=1 to 7 of a second matrix K, wherein the block elements $K_{rs}$ where r=3 to 6 and s=3 to 6 correspond to the block elements $M_{mn}$ where m=1 to 4 and n=1 to 4 of the first matrix M. The context area K1 has horizontal edges 51, 52 and vertical edges 53, 54, which are each formed by seven blocks. As shown for the block with the block element $K_{77}$ in FIG. 2, each block contains 4×4 pixels. By way of example, the block with the block element $K_{33}$ corresponds to the block with the block element $M_{11}$ and the block with the block element $K_{66}$ corresponds to the block with the block element $M_{44}$.

In other words, the context area K1 is formed by stretching around the macroblock M1 a border from blocks with the block elements K11, K12, K13, K14, K15, K16, K17, K21, K22, K23, K24, K25, K26, K27, K31, K32, K37, K41, K42, K47, K51, K52, K57, K61, K62, K67, K71, K72, K73, K74, K75, K76 and K77. The image data of the unfiltered reconstructed image are used as image data for these blocks. The image data of the unfiltered reconstructed image can be taken from an image memory for the unfiltered image material. Along the horizontal edge 41 of the macroblock M1 and along the vertical edge 43 of the macroblock M1, thus in each case adjoining rows of pixels P are included in the context area in addition to the pixels P of blocks B of the macroblock M1. In addition, along the horizontal edge 42 of the macroblock M1 and along the vertical edge 44 of the macroblock M1, in each case four rows of pixels P are included. The border stretched around the macroblock, said border formed from blocks B of the context area K1, contains only parts of the macroblocks M2-M9 (see FIG. 1). The blocks B of the macroblocks M2-M9 and further macroblocks not shown in FIG. 2, which are not included in the context area K1, form an outer area 60 of blocks B, adjacent to the context area K1. By limiting the blocks B used for filtering per macroblock M1-M9 to a total of 49 blocks, it is possible to filter each of the macroblocks M1-M9 independently of another macroblock. In this way, a number of macroblocks can be filtered in parallel to each other and simultaneously. The computing power of processors with a number of computation cores can be used with the simultaneous filtering of a number of context blocks K1, which can be filtered independently of each other. The result of the filtering can be saved in an image memory for the filtered image material.

The filtering of the vertical edges 1, 3 and the horizontal edges 2, 10 of the blocks B of the context area K1 starts with block element $K_{11}$ of the second matrix K, according to a specified coding standard for image information. In the example of an embodiment shown in FIG. 3, the specified coding standard for image information is standard H.264. Other standards are possible.

The sequence of filter steps for filtering the horizontal and vertical edges 1-29 in FIG. 3 corresponds to the number sequence 1-29 for the reference symbols of the horizontal and vertical edges 1-29. The edges 1-29 each extend to the next edge of macroblock M1 running perpendicularly to the edge. For example, in filter step 9, the vertical edge 9, which extends from the horizontal edge 41 of macroblock M1 to the horizontal edge 42 of macroblock M1, is filtered. Starting with the block element K11, for example, the vertical edges 3, 4, 5 and 6 of the blocks of block elements K13, K14, K15, K16, K23, K24, K25 and K26, from which the macroblock M3 is formed, along with other blocks, are filtered. After filtering the horizontal edge 7 and the vertical edge 8, the horizontal edges 10, 11, 12 and 13 of the blocks of block elements K31, K41, K51, K61, K32, K42, K52 and K62, from which the macroblock M5 is formed (along with other blocks) are filtered. With filter steps 14, 15, 16 and 17, vertical edges of the blocks of the macroblock M1 to be filtered are filtered. The filtering of the context area K1 with the macroblock M1 ends with the filtering of the horizontal edge 29 of the macroblock M1.

The filter steps 1-13 for the filtering of the pixels P of blocks B of the context area K1 with the block elements K11, K12, K13, K14, K15, K16, K17, K21, K22, K23, K24, K25, K26, K27, K31, K32, K37, K41, K42, K47, K51, K52, K57, K61, K62, K67, K71, K72, K73, K74, K75, K76 and K77, which do not correspond to the pixels P of blocks B of the first macroblock M1, are carried out chronologically before the filter steps 14-22 for the filtering of the pixels P of blocks B of the first macroblock M1. In this way, the pixels P of the blocks B of the first macroblock M1 are filtered using the already filtered pixels P of the blocks B of the context area K1 which do not correspond to the pixels P of the blocks B of the first macroblock M1. The filtered pixels P of the blocks B of the context area K1, which do not correspond to the pixels P of the blocks B of the first macroblock M1, are available as pre-filtered input pixels for the filtering of the macroblock M1 to be filtered.

The pre-filtered pixels P themselves are filtered according to the standard H.264 with partially unfiltered input pixels, wherein further pixels P of the blocks B in the outer area 60 of the context area K1 are not used for the filtering of the pre-filtered pixels P. Despite the use of these only nearly or approximately filtered pixels, when filtering the context area K1, a drift effect lower by orders of magnitude is achieved for the pixels P of the macroblock M1 to be filtered, than the drift effect which can be achieved with unfiltered pixels P as input pixels for the filtering of the macroblock M1 according to the naive filter method. Where the standard H.264 was used to filter the context area K1, measurements produced a probability for a pixel discrepancy of +/−1 of less than $2 \times 10^{-6}$ in contrast to a value of around $3 \times 10^{-3}$ for the naive filter method with unfiltered pixels P as inputs for filtering the macroblock M1. In contrast to the naive filter method, where standard H.264 is used to filter the context area K1, in terms of size, a pixel discrepancy of more than 1 occurs with a probability of less than $1 \times 10^{-9}$. The drift effect caused by these pixel discrepancies is negligibly small for many applications.

Depending on the deblocking filter strength, which increases with the number of pixels P to be included in the edge area, fewer pixels P than the pixels P of the blocks B of the context area K1, which do not correspond to the pixels P of the blocks B of the first macroblock M1, are used for the filtering of the pixels P of the blocks B of the first macroblock M1. In this way, the computing effort is reduced without any adverse effect on the image quality of the frame which is coded according to standard H.264 in macroblocks M1-M9 and blocks B.

Adjacent macroblocks M2, M3, which are filtered jointly, can form a macroblock area wherein the filtering of a macroblock M1 or macroblock area can occur independently of another macroblock M4 or another macroblock area. For example, four or more adjoining macroblocks M1-M9 can be filtered jointly. As the macroblocks M1-M9 are adjacent to each other, the context blocks K1 which contain these macroblocks M1-M9 overlap. Because of the once-only filtering of the overlapping areas of the context blocks K1, the effort in terms of computing power falls in comparison with the case in which all context blocks K1 are completely filtered with the macroblocks M1 to be filtered. For example, with an arrangement of four macroblocks M1, M6, M8 and M9 to be filtered jointly, as shown in FIG. 1 in two columns from the macroblocks M1, M8; M8, M9 and two rows from the macroblocks M1, M6; M8, M9 alongside the 64 blocks of the macroblocks M1, M6, M8 and M9 to be filtered, the context area can also contain 89 blocks to be filtered as the border around the macroblocks M1, M6, M8 and M9. The first of these 89 blocks to be filtered additionally, contain the block elements $M_{33}$, $M_{34}$, $M_{43}$ and $M_{44}$ of matrix M of the macroblock M2. Along the horizontal edge 41 are aligned the block elements $M_{31}$, $M_{32}$, $M_{33}$, $M_{34}$, $M_{41}$, $M_{42}$, $M_{43}$ and $M_{44}$ of matrix M of the macroblock M3 and the block elements $M_{31}$, $M_{32}$, $M_{33}$, $M_{34}$, $M_{41}$, $M_{42}$, $M_{43}$ and $M_{44}$ of matrix M of the macroblock M4. The context area of the macroblock area from the macroblocks M1, M6; M8, M9 has horizontal and vertical edges which are each formed from 11 blocks.

In the case of four macroblocks M1, M6, M8 and M9 to be filtered independently of each other, the context area K1 contains, in addition to the 64 blocks of the macroblocks M1, M6, M8 and M9 to be filtered, also in each case 33 blocks (49 blocks of each context area K1 less 16 blocks of each macroblock M1, M6, M8 and M9) as the border around the particular macroblock M1, M6, M8 and M9, thus in total 132 blocks. Accordingly in the case of the joint filtering of the four macroblocks M1, M6, M8 and M9, the context area contains 43 blocks less than in the case of the independent filtering of the four macroblocks M1, M6, M8 and M9. These 43 blocks less not only do not need to be filtered, but also do not need to be transferred from a main memory into a static random access memory (SRAM) for filtering. The number of macroblocks to be filtered jointly for the optimum utilisation of the available computing power of the processor used depends on the number of available computation cores and the size of the SRAM memory available.

The filtering of different macroblocks M1, M2 or macroblock areas occurs advantageously in parallel to each other and simultaneously. In this way, the computing power potential of modern processors with several computation cores can be fully utilised. If the parallel filtering of several macroblocks M1, M2 or macroblock areas is carried out on a processor with various computation cores, the filtering can occur with high computing rates of one teraflop/second or higher computing rates. To carry out the filtering of the context area K1, a computer program can be provided which contains the filter algorithm to carry out the filtering. To carry out the method according to the invention, a deblocking filter can be used. The deblocking filter is provided for filtering a macroblock M1-M9 according to standard H.264 which is saved in macroblocks M1-M9, which are arranged adjacent to each other horizontally in macroblock rows and adjacent to each other vertically in macroblock columns, wherein each macroblock M1-M9 is formed from blocks B which are arranged adjacent to each other horizontally in block rows m and adjacent to each other vertically in block columns n and form block elements $M_{mn}$ where m=1 to 4 and n=1 to 4 of a first matrix M, wherein the blocks B have vertical edges 14, 15 and horizontal edges 18, 19 forming the outer boundaries of the blocks B and whereby with block element $M_{11}$ as the starting point for filtering, the vertical edges 14, 15 and the horizontal edges 18, 19 of the blocks B of a macroblock M1-M9 can be filtered. The deblocking filter contains an analysis unit to determine a context area K1 containing the blocks B of a first macroblock M1 to be filtered, said context area being formed of blocks B which are arranged adjacent to each other horizontally in block rows o and adjacent to each other vertically in block columns p and form block elements $K_{op}$ where o=1 to 7 and p=1 to 7 of a second matrix K, wherein the block elements $K_{rs}$ where r=3 to 6 and s=3 to 6 correspond to the block elements $M_{mn}$ where m=1 to 4 and n=1 to 4 of the first matrix M. The deblocking filter also contains a filter unit for filtering the horizontal edges 1, 3 and the vertical edges 2, 10 of the blocks B of the context area K1 with the block element $K_{11}$ of the second matrix K as the starting point for filtering according to standard H.264.

The deblocking filter advantageously contains a processor with various computation cores. According to the example of an embodiment shown in FIG. 3, the filtering steps 1-29 can occur in parallel to each other.

The deblocking filter can include a main memory and a static random access memory. The main memory and the static random access memory can be disposed on a graphics card which is disposed in a computer.

With the deblocking filter, different macroblocks M1-M9 and/or different macroblock areas containing jointly filterable macroblocks M1-M9, can be filtered in parallel to each other and simultaneously. In this way, the computing time necessary to filter a macroblock M1-M9 can be reduced compared with filters which filter in series.

What is claimed is:

1. A deblocking filter apparatus configured to filter a first macroblock based on a coding standard for image information which is saved in macroblocks that are arranged adjacent to each other horizontally in macroblock rows and adjacent to each other vertically in macroblock columns, comprising:
  an analysis unit to specify a context area containing the blocks of the first macroblock to be filtered, the first macroblock to be filtered being formed from blocks which are arranged adjacent to each other horizontally in block rows m and adjacent to each other vertically in block columns n and form block elements $M_{mn}$, of a first matrix M, said context area being formed of blocks which are arranged adjacent to each other horizontally in block rows o and adjacent to each other vertically in block columns p and form block elements $K_{op}$ of a second matrix K, the context area comprising the blocks of the block elements $K_{op}$ of the second matrix K that do not correspond to the block elements $M_{mn}$ of the first matrix M; and
  a filter unit to filter the blocks of the context area for filtering according to the coding standard for image information such that the blocks of the block elements $K_{op}$ of the second matrix K that correspond to the blocks of the block elements $M_{mn}$ of the first matrix M are not filtered during the filtering of the blocks of the context area;
  the filter unit to filter the blocks of the context area of the first macroblock independently of blocks of a context area of a second macroblock adjacent to the first macroblock and simultaneously filter the blocks of the context area of the second macroblock in parallel with filtering of the blocks of the context area of the first macroblock.

2. The deblocking filter apparatus of claim 1 wherein the analysis unit is comprised of a processor.

3. The deblocking filter apparatus of claim 2 wherein the filter unit is comprised of a processor.

4. The deblocking filter apparatus of claim 1 wherein the filter unit is comprised of a processor.

5. The deblocking filter apparatus of claim 1 wherein the coding standard for image information is the standard H.264.

6. The deblocking filter apparatus of claim 1 wherein the filter unit is to filter the blocks of the context area of the first macroblock for filtering according to the coding standard for image information such that the blocks of the block elements $K_{op}$ of the second matrix K that correspond to the blocks of the block elements $M_{mn}$ of the first matrix M are not filtered during the filtering of the blocks of the context area of the first macroblock by a filtering process that comprises:
  forming each block from pixels to be filtered, which are arranged adjacent to each other horizontally in pixel rows and adjacent to each other vertically in pixel columns;
  filtering pixels of the blocks of the context area of the first macroblock which do not correspond to the pixels of the blocks of the first matrix of the first macroblock chronologically before the pixels of the blocks of the first macroblock; and
  filtering the pixels of the blocks of the first matrix of the first macroblock using the filtered pixels of the blocks of the context area of the first macroblock which do not correspond to the pixels of the blocks of the first matrix of the first macroblock.

7. The deblocking filter apparatus of claim 6 wherein the filtering process also comprises using fewer pixels than the pixels of the blocks in the context area of the first macroblock, which do not correspond to the pixels of the blocks of the first matrix of the first macroblock, to filter the pixels of the blocks of the first macroblock.

8. The deblocking filter apparatus of claim 1 wherein the filter unit is to filter the blocks of the context area of the first macroblock for filtering according to the coding standard for image information such that the blocks of the block elements $K_{op}$ of the second matrix K that correspond to the blocks of the block elements $M_{mn}$ of the first matrix M are not filtered during the filtering of the blocks of the context area of the first macroblock by a filtering process that comprises:
  forming each block from pixels to be filtered;
  filtering pixels of the blocks of the context area of the first macroblock which do not correspond to the pixels of the blocks of the first matrix of the first macroblock chronologically before the pixels of the blocks of the first matrix of the first macroblock; and
  filtering the pixels of the blocks of the first matrix of the first macroblock using the filtered pixels of the blocks of the context area of the first macroblock which do not correspond to the pixels of the blocks of the first matrix of the first macroblock.

9. The deblocking filter apparatus of claim 1 wherein the deblocking filter apparatus is configured so that the adjacent first and second macroblocks are filtered jointly and independently such that filtering of the first macroblock occurs independently of the second macroblock and simultaneously in parallel with filtering of the second macroblock;
  the second macroblock formed from blocks which are arranged adjacent to each other horizontally in block rows m and adjacent to each other vertically in block columns n and form block elements $M_{mn}$ of a third matrix M of the second macroblock, said context area of the second macroblock being formed of blocks which are arranged adjacent to each other horizontally in block rows o and adjacent to each other vertically in block columns p and form block elements $K_{op}$ of a fourth matrix K of the second macroblock, the context area of the second macroblock comprising the blocks of the block elements $K_{op}$ of the fourth matrix K of the second macroblock that do not correspond to the block elements $M_{mn}$ of the third matrix M of the second macroblock; and
  the filter unit to filter the blocks of the context area of the second macroblock independently of and simultaneously in parallel with filtering of the blocks of the context area of the first macroblock such that the filtering of the blocks of the context area of the second macroblock for filtering according to the coding standard for image information occurs so that the blocks of the block elements $K_{op}$ of the fourth matrix K that correspond to the blocks of the block elements $M_{mn}$ of the third matrix M of the second macroblock are not filtered during the filtering of the blocks of the context area of the second macroblock and are filtered independently of the blocks of the context area of the first macroblock and are filtered simultaneously in parallel with the blocks of the context area of the first macroblock.

10. A deblocking filter for filtering macroblocks of a macroblock area based on a coding standard for image information which is saved in the macroblocks of the macroblock area, the macroblock area comprising macroblocks that are arranged adjacent to each other horizontally in macroblock rows and adjacent to each other vertically in macroblock columns, wherein each of the macroblocks is formed from blocks which are arranged adjacent to each other horizontally in block rows m and adjacent to each other vertically in block columns n and form block elements $M_{mn}$ of a first matrix M, the filter comprising:
  a processor to specify, for each macroblock of the macroblock area, a context area containing the blocks of the macroblock to be filtered, said context area being formed of blocks which are arranged adjacent to each other horizontally in block rows o and adjacent to each other vertically in block columns p and form block elements $K_{op}$ of a second matrix K, the context area comprising the blocks of the block elements $K_{op}$ of the second matrix K that do not correspond to the block elements $M_{mn}$ of the first matrix M; and
  the processor to filter the blocks of the context area for filtering according to the coding standard for image information such that the blocks of the block elements $K_{op}$ of the second matrix K that correspond to the blocks of the block elements $M_{mn}$ are not filtered during the filtering of the blocks of the context area;
  the processor to filter the blocks of the context area such that the blocks of the context area for each of the macroblocks of the macroblock area are filtered independently from the other macroblocks of the macroblock area and are filtered simultaneously in parallel with the other macroblocks of the macroblock area.

11. The deblocking filter of claim 10, wherein the processor has multiple computation cores.

12. The deblocking filter of claim 11, wherein the filter also comprises a main memory and a static random access memory.

13. The deblocking filter of claim 12, wherein the processor is configured such that the blocks of the first matrix M for each of the macroblocks of the macroblock area are filtered independently of each other and in parallel with each other simultaneously after the context areas for the macroblocks of the macroblock area are filtered, filtered pixels of the blocks of the context area being used as input pixels for the filtering of the blocks of the first matrix M.

14. A non-transitory computer readable storage medium having a computer program stored thereon that, when executed by a processor of an electronic device, causes the electronic device executing the program to perform a deblocking filtering method for macroblocks of a macroblock area based on a coding standard for image information which is saved in the macroblocks, the macroblocks of the macroblock area being arranged adjacent to each other horizontally in macroblock rows and adjacent to each other vertically in macroblock columns, each of the macroblocks of the macroblock area being formed from blocks which are arranged adjacent to each other horizontally in block rows m and adjacent to each other vertically in block columns n and form block elements $M_{mn}$ of a first matrix M, the deblocking filtering method comprising:
  determining, for each of the macroblocks of the macroblock area independently of the other macroblocks of the macroblock area and simultaneously in parallel with the other macroblocks of the macroblock area, a context area surrounding the blocks of the first matrix M of the macroblock, said context area being formed from blocks which are arranged adjacent to each other horizontally in block rows o and adjacent to each other vertically in block columns p and form block elements $K_{op}$ of a second matrix K, the context area comprising the blocks of the block elements $K_{op}$ that do not correspond to the blocks of the block elements $M_{mn}$ of the first matrix M;
  filtering, for each of the macroblocks of the macroblock area independently of the other macroblocks of the macroblock area and simultaneously in parallel with the other macroblocks of the macroblock area, the blocks of the context area that surround the macroblock according to the coding standard for image information such that the blocks of the block elements $K_{op}$ of the second matrix K that correspond to the blocks of the block elements $M_{mn}$ are not filtered during the filtering of the blocks of the context area that surround the macroblock; and
  filtering, for each of the macroblocks of the macroblock area independently of the other macroblocks of the macroblock area and simultaneously in parallel with the other macroblocks of the macroblock area, the blocks of the first matrix of the macroblock after the filtering of the blocks of the context area via use of filtered pixels of the blocks of the context area as input pixels for the filtering of the blocks of the first matrix.

15. The non-transitory computer readable storage medium of claim 14 wherein the coding standard for image information is the standard H.264.

16. The non-transitory computer readable storage medium of claim 14 wherein the deblocking filtering method also comprises:
  forming each block for the macroblocks of the macroblock area from pixels to be filtered, which are arranged adjacent to each other horizontally in pixel rows and adjacent to each other vertically in pixel columns.

17. The non-transitory computer readable storage medium of claim 16 wherein the deblocking filtering method also comprises:
  filtering, for each of the macroblocks of the macroblock area independently of the other macroblocks of the macroblock area and simultaneously in parallel with the other macroblocks of the macroblock area, pixels of the blocks of the context area which do not correspond to the pixels of the blocks of the first matrix of the macroblock chronologically before the pixels of the blocks of the first matrix of the macroblock.

18. The non-transitory computer readable storage medium of claim 17, wherein, for each of the macroblocks of the macroblock area, there are more pixels in the blocks of the context area than there are pixels in the blocks of the first matrix.

* * * * *